(12) United States Patent
Tatsuta

(10) Patent No.: US 6,282,319 B1
(45) Date of Patent: *Aug. 28, 2001

(54) CODE INFORMATION REPRODUCTION SYSTEM FOR ADAPTIVELY CONTROLLING BLOCK DECODING FORMAT BASED ON CODE READING STATE

(75) Inventor: Seiji Tatsuta, Hino (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,709

(22) Filed: Mar. 31, 1998

(30) Foreign Application Priority Data

Apr. 28, 1997 (JP) .................................................. 9-110965
Dec. 25, 1997 (JP) .................................................. 9-357682

(51) Int. Cl.⁷ ......................................................... G06K 9/36
(52) U.S. Cl. ............................... 382/232; 382/317; 358/433
(58) Field of Search ........................................ 358/433, 474, 358/470, 479, 527, 504, 505, 538, 539, 540, 467; 382/313, 164, 165, 317, 232, 233, 248

(56) References Cited

U.S. PATENT DOCUMENTS

| | | | |
|---|---|---|---|
| 4,760,247 | * | 7/1988 | Keane et al. ........................ 235/454 |
| 5,010,580 | * | 4/1991 | Vincent et al. ..................... 358/527 |
| 5,086,497 | * | 2/1992 | Horikawa et al. .................. 395/147 |
| 5,189,292 | * | 2/1993 | Batterman et al. ................. 235/494 |
| 5,235,655 | * | 8/1993 | Mikawa ............................... 382/61 |
| 5,321,440 | * | 6/1994 | Yanagihara et al. ............... 348/408 |
| 5,420,943 | * | 5/1995 | Mak ..................................... 382/313 |
| 5,541,396 | * | 7/1996 | Rentsch .............................. 235/454 |
| 5,596,659 | * | 1/1997 | Normile et al. .................... 382/253 |
| 5,717,197 | * | 2/1998 | Petrie ................................. 235/494 |
| 5,774,583 | * | 6/1998 | Sasaki et al. ...................... 382/190 |

* cited by examiner

Primary Examiner—Madeleine Nguyen
(74) Attorney, Agent, or Firm—Frishauf, Holtz, Goodman, Langer & Chick, P.C.

(57) ABSTRACT

A reading unit optically reads a code including a plurality of blocks arranged in accordance with a predetermined block layout format by sensing the code to include a plurality of blocks within one image sensing frame. A block detection unit detects the blocks from the code read by the reading unit. An address data acquisition unit acquires address data of the blocks detected by the block detection unit. A block data decoding unit decodes block data from the data patterns of the blocks detected by the block detection unit. An information data reproduction unit reproduces original information data by coupling the block data decoded by the block data decoding unit in accordance with the address data acquired by the address data acquisition unit. An image sensing state discrimination unit discriminates the image sensing state of the code read by the reading unit. A block decoding control unit controls the block data decoding unit based on the code image sensing state discriminated by the image sensing state discrimination unit so as to preferentially decode appropriately sensed blocks of the plurality of decodable blocks.

12 Claims, 9 Drawing Sheets

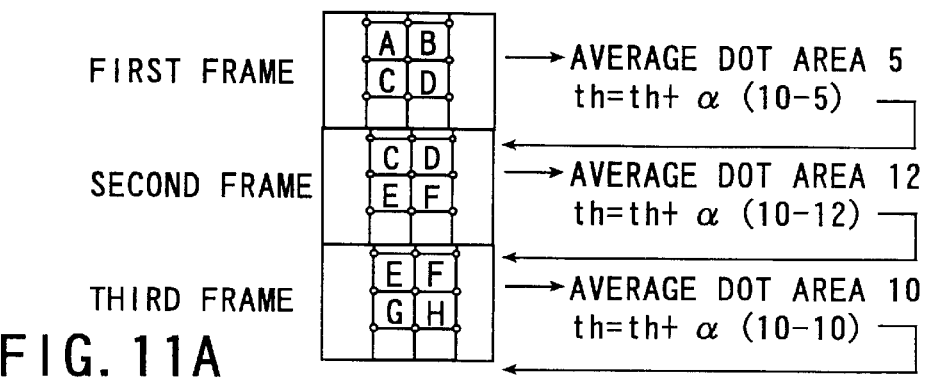
FIG. 11A
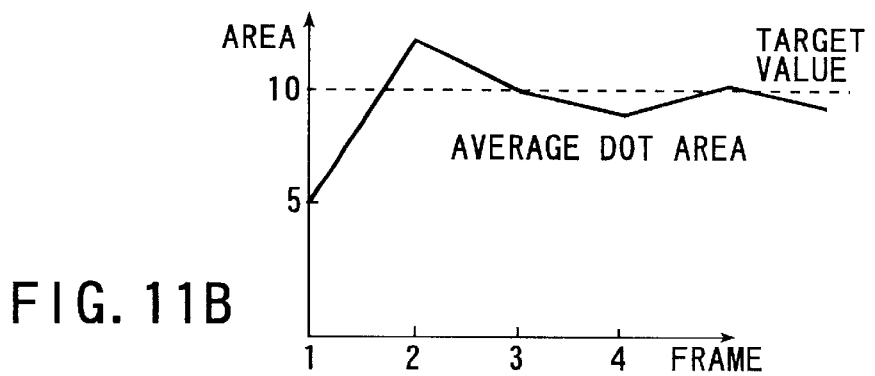
FIG. 11B
| FRAME | BLOCK | CERTAINTY | CERTAINTY STORAGE STATE TRANSITION | |
|---|---|---|---|---|
| 1 | A<br>B<br>C<br>D | 5 | 5<br>5<br>5<br>5 | |
| 2 | C<br>D<br>E<br>F | 8 | 5 → 8<br>5 → 8<br>8<br>8 | 5 < 8 RE-DECODE<br>5 < 8 RE-DECODE |
| 3 | E<br>F<br>G<br>H | 10 | 8 → 10<br>8 → 10<br>8<br>8 | 8 < 10 RE-DECODE<br>8 < 10 RE-DECODE |
| 4 | G<br>H<br>I<br>J | 9 | ×<br>×<br>9<br>9 | 10 > 9 NOT RE-DECODE<br>10 > 9 NOT RE-DECODE |
| ⋮ | ⋮ | ⋮ | ⋮ | |
FIG. 12

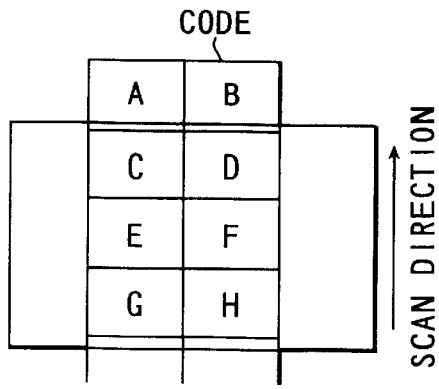
FIG. 15A
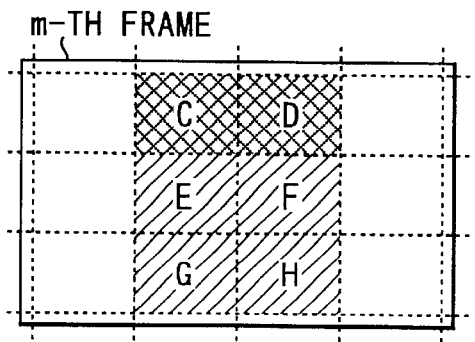
FIG. 15B
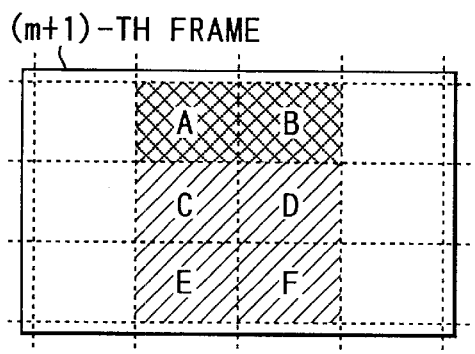
FIG. 15C
| FRAME | BLOCK | CERTAINTY | CERTAINTY STORAGE STATE TRANSITION |
|---|---|---|---|
| m | C | 2 | 2 |
|  | D | 1 | 1 |
|  | E | 4 | 4 |
|  | F | 3 | 3 |
|  | G | 4 | 4 |
|  | H | 4 | 4 |
| m+1 | A | 2 | 2 |
|  | B | 1 | 1 |
|  | C | 4 | 2 → 4 |
|  | D | 3 | 1 → 3 |
|  | E | 4 | 4 → 4 |
|  | F | 4 | 3 → 4 |
| ⋮ | ⋮ | ⋮ | ⋮ |
2 < 4 RE-DECODE
1 < 3 RE-DECODE
4 < 4 NOT RE-DECODE
3 < 4 RE-DECODE
FIG. 16

CODE INFORMATION REPRODUCTION SYSTEM FOR ADAPTIVELY CONTROLLING BLOCK DECODING FORMAT BASED ON CODE READING STATE

BACKGROUND OF THE INVENTION

The present invention relates to an information reproduction system which can prevent code reproduction errors and reduces decoding processing of invalid block data. This is accomplished by adaptively controlling the block decoding method in accordance with the image sensing state of a code upon reproduction of a code which is obtained by optically readably recording a plurality of blocks having block data each of which is obtained by segmenting information data in units of predetermined information volumes, and block headers indicating addresses assigned in units of blocks, in accordance with a predetermined block layout format.

The assignee of the present application who is also the assignee of U.S. patent application Ser. No. 08/571,776 which relates to an information recording medium and information reproduction system as a system that segments digital data in units of blocks each having a predetermined information volume, records the segmented blocks, and reproduces the recorded blocks.

This system reads the segmented block data together with their address data, and reproduces information by coupling the block data on the basis of the address data.

Since this system has a mechanism for recording/reproducing data in units of segmented blocks, it has excellent expandability of data and reading flexibility, and can read data that cannot fall within one image sensing frame by scanning a code.

This system is excellent since it also allows reading based on manual scans that may cause blur or changes in scan speed.

The system is very effective for recording/reproducing data in units of segmented blocks.

Hence, since the system decodes data in units of blocks, invalid blocks or inappropriately sensed blocks must be decoded carefully.

As the measure against such blocks, U.S. Ser. No. 08/571,776 (identified above) proposed the following systems. That is, in one system, data are decoded in turn from blocks on the image sensing frame on the scan direction side, and decoding is stopped upon detecting block data with identical address data. In the other system, data are decoded in turn from outer blocks on the image sensing frame, inner block data on the image sensing frame are overwritten on the decoded data, and block data which are expected to suffer less distortion on the inner side of the image sensing frame are finally reproduced.

With these systems, high-speed decoding can be attained by obviating the need for decoding invalid blocks, and code reproduction errors due to defective readout blocks can be reduced.

However, the system disclosed in U.S. Ser. No. 08/571,776 does not sufficiently consider the image sensing state of a code.

For example, in the system disclosed in U.S. Ser. No. 08/571,776, even when illumination on the scan direction side is dark due to scanner tilt, and the image sensing state is inappropriate, block data on the scan direction side are preferentially decoded, resulting in code reproduction errors.

Also, in the system disclosed in U.S. Ser. No. 08/571,776, since the image sensing states of blocks change as scanning progresses, blocks sensed at the center of the image sensing frame are not always the optimal ones.

In other words, the system disclosed in U.S. Ser. No. 08/571,776 does not appropriately decode data in correspondence with the image sensing state of the code, and leaves room for improvement in this point.

BRIEF SUMMARY OF THE INVENTION

The present invention has been made in consideration of the above situation, and has as its object to provide an information reproduction system which can prevent code reproduction errors due to decoding of inappropriately sensed blocks, and can reduce decoding of invalid block data.

In order to achieve the above object, according to the present invention, there is provided an information reproduction system for reproducing a code defined by a plurality of blocks each of which includes at least a data pattern, which is imaged in accordance with contents of block data obtained by segmenting information data in units of predetermined information volumes, and a header pattern, which is imaged in accordance with contents of a block header indicating an address assigned to each block, and which blocks are arranged according to a predetermined block layout format, comprising:

reading means for optically reading the code by sensing the code to include a plurality of blocks within one image sensing frame;

block detection means for detecting the blocks from the code within one image sensing frame read by the reading means;

address data acquisition means for acquiring address data of the blocks detected by the block detection means;

block data decoding means for decoding block data from the data patterns of the blocks detected by the block detection means;

information data reproduction means for reproducing original information data by coupling the block data decoded by the block data decoding means in accordance with the address data acquired by the address data acquisition means;

image sensing state discrimination means for discriminating an image sensing state of the code read by the reading means; and block decoding control means for controlling the block data decoding means based on the code image sensing state discriminated by the image sensing state discrimination means so as to preferentially decode appropriately sensed blocks of the plurality of decodable blocks.

Also, according to the present invention, there is provided an information reproduction system for reproducing a code defined by a plurality of blocks each of which includes at least a data pattern, which is imaged in accordance with contents of block data obtained by segmenting information data in units of predetermined information volumes, and a header pattern, which is imaged in accordance with contents of a block header indicating an address assigned to each block, and which blocks are arranged according to a predetermined block layout format, comprising:

a reader for optically reading the code by sensing the code to include a plurality of blocks within one image sensing frame;

a block detector for detecting the blocks from the code within one image sensing frame read by the reader;

an address data acquisition device for acquiring address data of the blocks detected by the block detector;

a block data decoder for decoding block data from the data patterns of the blocks detected by the block detector;

an information data reproduction device for reproducing original information data by coupling the block data decoded by the block data decoder in accordance with the address data acquired by the address data acquisition device;

an image sensing state discrimination device for discriminating an image sensing state of the code read by the reader; and a block decoder for controlling the block data decoder based on the code image sensing state discriminated by the image sensing state discrimination device so as to preferentially decode appropriately sensed blocks of the plurality of decodable blocks.

Furthermore, according to the present invention, there is provided a code information reproduction method for reproducing a code defined by a plurality of blocks each of which includes at least a data pattern, which is imaged in accordance with contents of block data obtained by segmenting information data in units of predetermined information volumes, and a header pattern, which is imaged in accordance with contents of a block header indicating an address assigned to each block, and which blocks are arranged according to a predetermined block layout format, comprising the steps of:

optically reading the code by sensing the code to include a plurality of blocks within one image sensing frame;

detecting the blocks from the read code within one image sensing frame;

acquiring address data of the detected blocks;

decoding block data from the data patterns of the detected blocks;

reproducing original information data by coupling the decoded block data in accordance with the acquired address data;

discriminating an image sensing state of the read code; and controlling the block data decoding step based on the discriminated code image sensing state so as to preferentially decode appropriately sensed blocks of the plurality of decodable blocks.

The first embodiment corresponds to an embodiment according to this invention, and its arrangement is as shown in FIG. 1.

The image sensing state discrimination means corresponds to the illumination state discrimination unit of the first embodiment, and the block decoding control means corresponds to the block detection order controller and block data decoding order controller in the first embodiment.

Each block has a block header and block data, as shown in FIG. 2A, and is recorded to have a physical structure, as shown in, e.g., FIG. 2B.

Note that each block may have other shapes such as triangular shape, hexagonal shape, and the like, and FIGS. 2A and 2B do not limit the shape and positional relationship.

Each block has a size that allows one image sensing frame to include a plurality of blocks, and the blocks are recorded according to a predetermined layout format, as shown in FIG. 3.
(Operation)
The image sensing state discrimination means in FIG. 3 extracts a feature pertaining to the image sensing state of a code from the reading means or the image sensing frame read by the reading means, and discriminates the image sensing state of the code.

The block decoding control means controls the block decoding methods, e.g., the block decoding order, permission/inhibition of re-decoding, and the like on the basis of the image sensing state of the code discriminated by the image sensing state discrimination means, so that appropriately sensed blocks of a plurality of decodable blocks are preferentially decoded.
(Advantage)
Since the block decoding methods can be controlled in accordance with the image sensing state of the code so that appropriately sensed blocks are preferentially decoded, code reproduction errors due to decoding of inappropriately sensed blocks can be prevented, and decoding of invalid block data can be reduced.

According to the present invention, there is provided an information reproduction system characterized in that the image sensing state discrimination means discriminates the image sensing state in units of subframes obtained by segmenting the one image sensing frame into a plurality of regions each having an area substantially equal to or larger than the block.

The first embodiment corresponds to an embodiment according to this invention, and its arrangement is as shown in FIG. 1.
(Operation)
As shown in FIG. 4, the image sensing state discrimination means segments one image sensing frame into a plurality of regions each having an area substantially equal to or larger than each block, extracts features concerning the image sensing state of a code in units of segmented subframes, and discriminates the image sensing state on the basis of the relationship between the subframe positions and extracted features.
(Advantage)
With this arrangement, since the image sensing state of the code in the image sensing frame can be discriminated in units of subframes, non-uniform image sensing in the image sensing frame can be coped with.

According to the present invention, there is provided an information reproduction system characterized in that the block decoding control means includes block detection order control means for controlling a block detection order of the block detection means on the basis of a discrimination result of the code image sensing state by the image sensing state discrimination means.

The first embodiment corresponds to an embodiment according to this invention, and its arrangement is as shown in FIG. 1.
(Operation)
The block detection order control means controls the block detection order on the basis of the discrimination result of the code image sensing state by the image sensing state discrimination means so that blocks are detected from a portion which was sensed well.

Note that block detection is to detect constituting elements of a block from the image sensing frame, and corresponds to marker detection in a block with the structure shown in, e.g., FIG. 2B.
(Advantage)
Since the block decoding control means has the above-mentioned arrangement, blocks can be detected from a portion which was sensed well, and block detection can be easily and reliably done.

Furthermore, even when the number of blocks to be detected, the time required for block detection, or the like is limited, processing can be done from valid blocks, thus also attaining a reduction of the memory capacity and high-speed processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 11A and 11B are views for explaining adaptive binarization control by a binarization unit 11 shown in FIG. 10;

FIG. 12 is a view for explaining the relationship between the certainty and re-decoding control by a re-decoding controller 34 shown in FIG. 10;

FIGS. 15A, 15B, and 15C are views for explaining changes in image sensing state as code scanning progresses;

FIG. 16 is a view for explaining the relationship between the certainty and re-decoding control by a re-decoding controller 34 shown in FIG. 13;

DETAILED DESCRIPTION OF THE INVENTION

Figure 1:
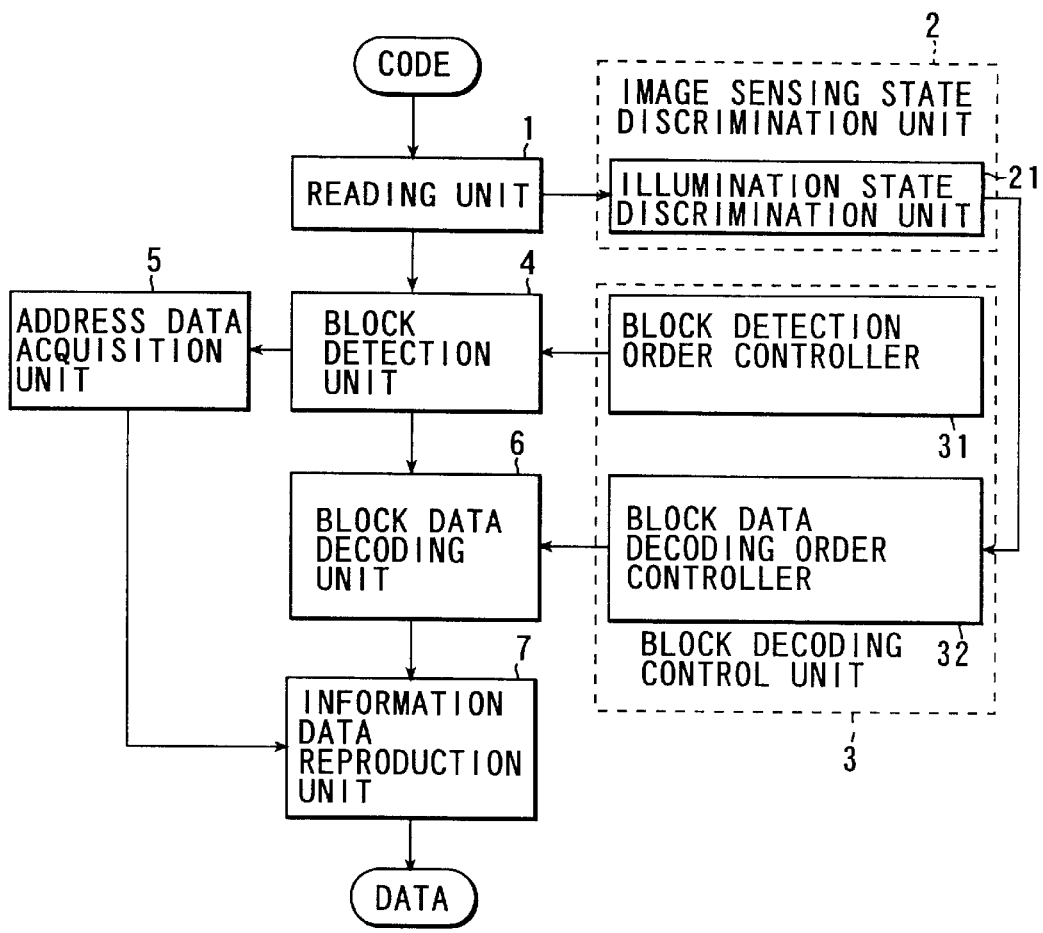
FIG. 1 is a schematic block diagram showing the arrangement of an information reproduction system according to the first embodiment of the present invention.

Reference will now be made in detail to the presently preferred embodiments of the invention as illustrated in the accompanying drawings, in which like reference characters designate like or corresponding parts throughout the several drawings.

(First Embodiment)

The first embodiment of the present invention will be described below with reference to FIGS. 1 to 6.

As shown in FIG. 1, an information reproduction system according to this embodiment comprises a reading unit 1, image sensing state discrimination unit 2, block decoding control unit 3, block detection unit 4, address data acquisition unit 5, block data decoding unit 6, and information data reproduction unit 7.

Note that the image sensing state discrimination unit 2 comprises an illumination state discrimination unit 21.

The block decoding control unit 3 comprises a block detection order controller 31 and block data decoding order controller 32.

The operation and advantage of this embodiment will be explained below.

Figure 3:
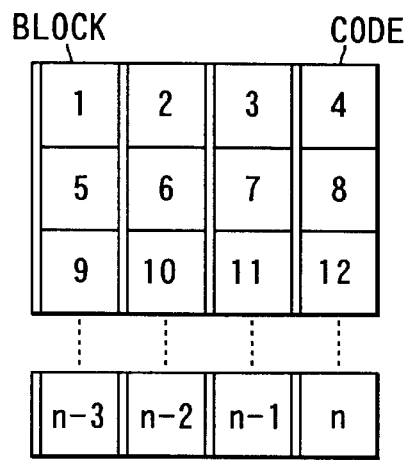
FIG. 3 shows the block layout in a code sensed by the reading unit 1 shown in FIG. 1.

The reading unit 1 senses a code which is optically readably recorded in a predetermined block layout format using an image sensing device such as a CCD scanner, as shown in FIG. 3, and converts it into an electrical signal.

Figure 4:
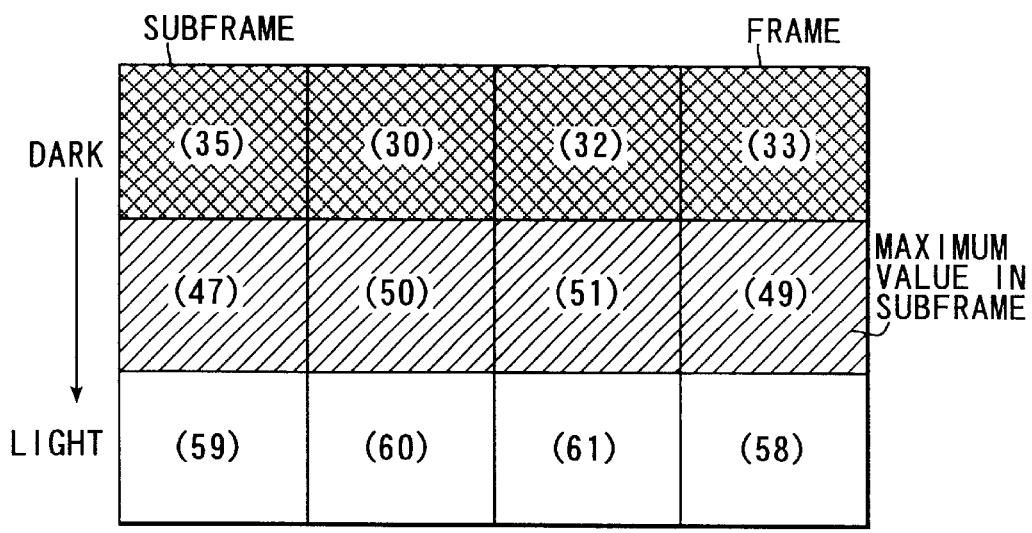
FIG. 4 shows the relationship between segmentation of the image sensing frame and extraction of a feature to discriminate the illumination states in units of subframes by an illumination state discrimination unit 21 shown in FIG. 1.

The illumination state discrimination unit 21 extracts, as features, the maximum values of luminance (numerical values in parentheses in subframes shown in FIG. 4) in units of subframes obtained by segmenting an image sensing frame sensed by the reading unit 1 into 12 subframes, as shown in FIG. 4, and discriminates the illumination states in units of subframes.

The block detection unit 4 detects blocks from the code sensed by the reading unit 1.

The block detection by the block detection unit 4 uses a known method of, e.g., detecting markers indicating the four corners of each block, as described in U.S. Ser. No. 08/571,776, when each block has a structure shown in, for example, FIG. 2B.

The block detection order controller 31 controls the block detection unit 4 so that blocks are detected in the order from lighter portions in the frame on the basis of the illumination states discriminated by the illumination state discrimination unit 21.

Figure 5A:
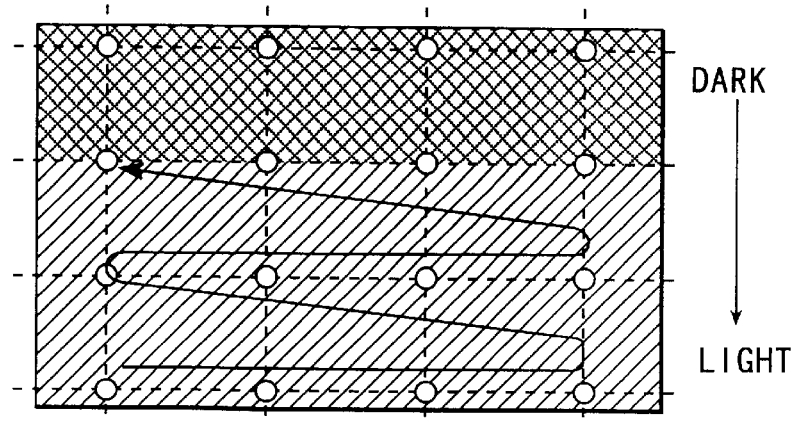
FIGS. 5A and 5B show the control of the block detection order by a block detection order controller 31 shown in FIG. 1.

FIG. 5A shows this state.

With this control, even when the upper portion of the frame is dark and many erroneous markers are detected, the block detection unit 4 can start detection of markers from the light lower portion of the frame, and can detect valid blocks fast.

Figure 5B:
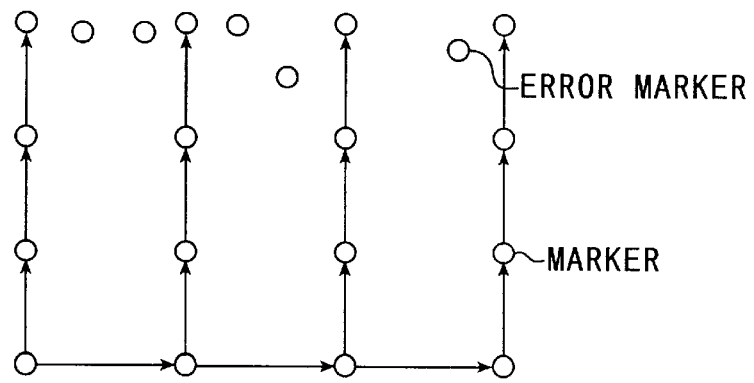

Also, as shown in, e.g., FIG. 5B, the block detection unit 4 calculates vectors V for finding vertically neighboring markers and vectors H for finding horizontally neighboring markers on the basis of the detected correspondence among the markers. The detection unit 4 then detects the remaining markers by sequentially expanding these vectors, thus allowing easy and reliable detection of markers.

The address data acquisition unit 5 acquires addresses from the blocks detected by the block detection unit 4 on the basis of their block structure.

Also, the block data decoding unit 6 decodes block data from the blocks detected by the block detection unit 4.

The information data reproduction unit 7 re-arranges the block data decoded by the block data decoding unit 6 in accordance with the addresses acquired by the address data acquisition unit 5, thus reproducing data.

Figure 6:
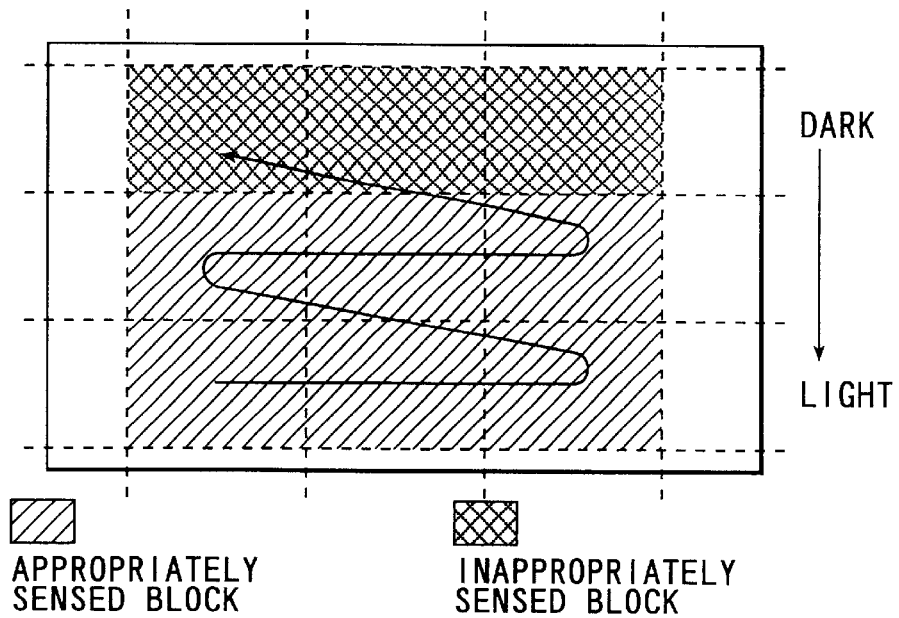
FIG. 6 shows the control of the block data decoding order by a block data decoding order controller 32 shown in FIG. 1.

The block data decoding order controller 32 controls the block data decoding unit 6, so that block data are decoded in the order from lighter blocks in the frame on the basis of the illumination states discriminated by the illumination state discrimination unit 21, as shown in FIG. 6.

In this way, since the information reproduction system according to the first embodiment of the present invention can sequentially decode blocks from the side which was illuminated more appropriately by determining inappropriate image sensing caused by shading or the like arising from illumination variations in the frame and tilt of the CCD scanner, it can easily and reliably detect valid blocks, can prevent code reproduction errors, and can reduce decoding of invalid blocks.

Furthermore, in real-time processing, the processing must be completed within a one-frame period. However, as the information reproduction system according to the first embodiment of the present invention sequentially detects and decodes in the order from valid blocks, valid blocks can be prevented from being omitted due to time-out (out of processing time).

(Second Embodiment)

The second embodiment of the present invention will be described below with reference to FIGS. 7 to 9.

Figure 7:
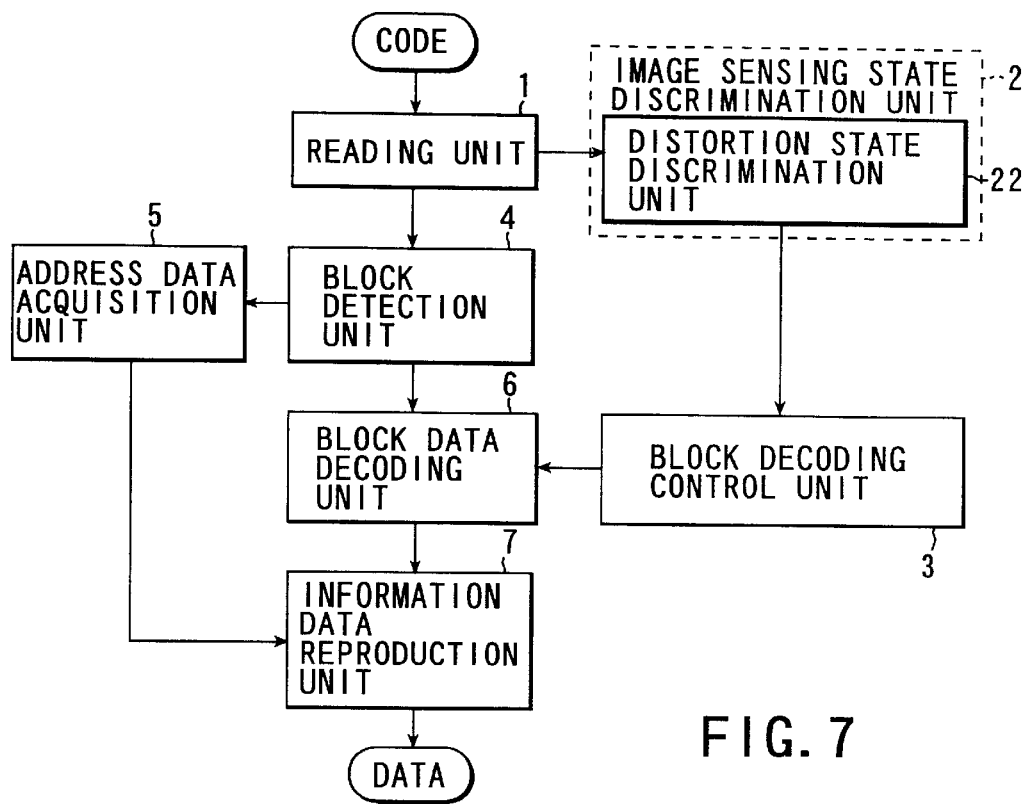
FIG. 7 is a schematic block diagram showing the arrangement of an information reproduction system according to the second embodiment of the present invention.

As shown in FIG. 7, an information reproduction system of this embodiment comprises a reading unit 1, image sensing state discrimination unit 2, block decoding control unit 3, block detection unit 4, address data acquisition unit 5, block data decoding unit 6, and information data reproduction unit 7.

In this embodiment, the image sensing state discrimination unit 2 includes a distortion state discrimination unit 22, as shown in FIG. 7.

The operation and advantage of this embodiment will be described below. In the following description, since the units denoted by the same reference numerals as in the first embodiment mentioned above have the same operation and advantage as those in the first embodiment, a detailed description thereof will be omitted, and only the distortion state discrimination unit 22 will be explained.

Figure 8:
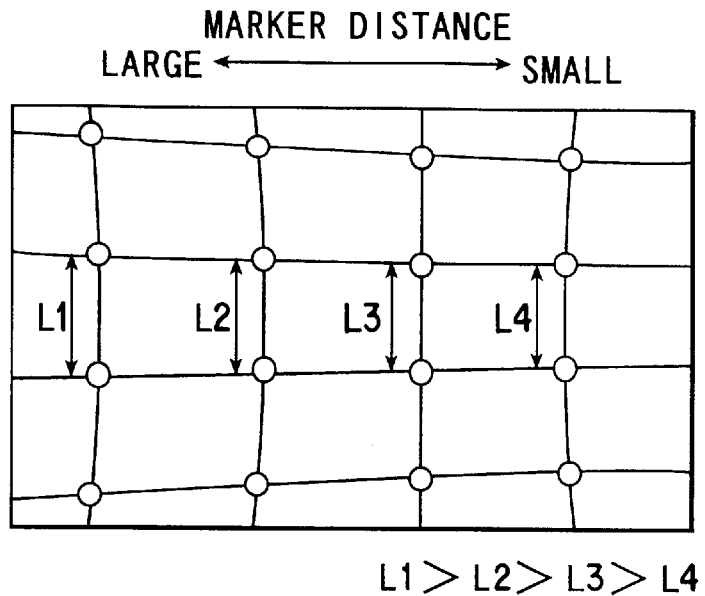
FIG. 8 is a view for explaining discrimination of block distortion by a distortion state discrimination unit 22 shown in FIG. 7.

As shown in FIG. 8, the distortion state discrimination unit 22 discriminates block distortion on the basis of the length of one side of a block detected by the block detection unit 4.

The block decoding control unit 6 controls the block decoding control unit 3 on the basis of the distortion states of blocks discriminated by the distortion state discrimination unit 22.

Note that the distortion state discrimination unit 22 discriminates the distortion state of a block as follows. For example, when a code with the block structure shown in FIG. 2B is read, the unit 22 checks the distances between adjacent markers, as shown in FIG. 8, and discriminates based on these distances that the left side of the frame suffers less distortion.

This corresponds to a case wherein the CCD scanner is separated from a recording medium which must be in tight contact with the scanner, due to a tilt of the CCD scanner, and blocks on the right side of the frame are sensed smaller.

Figure 9:
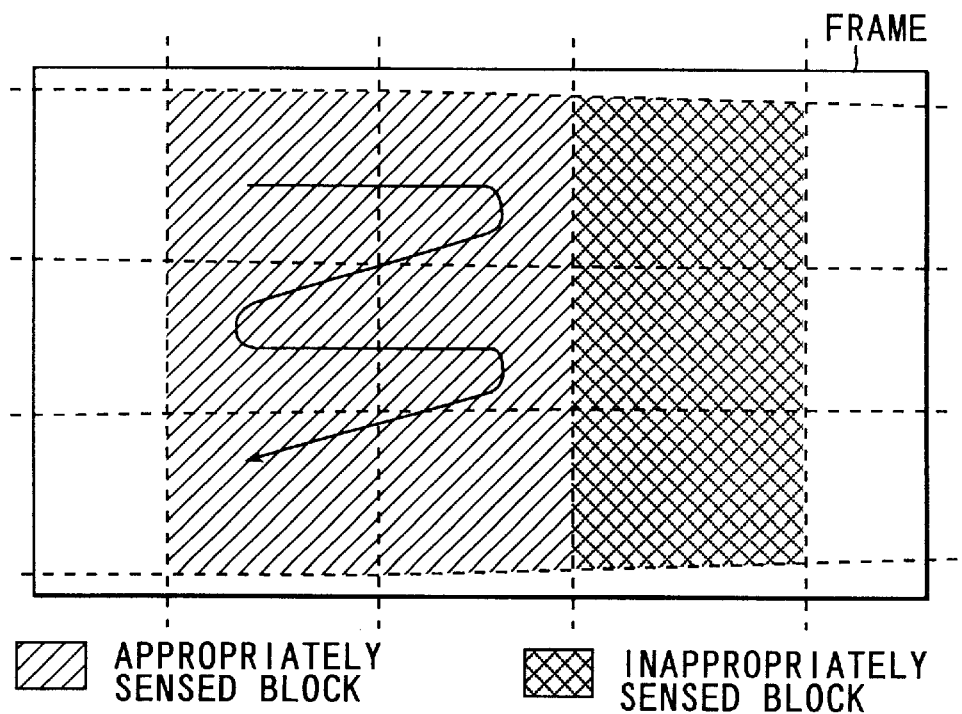
FIG. 9 is a view for explaining the control of the block decoding order by a block decoding control unit 3 shown in FIG. 7.

The block decoding control unit 3 preferentially decodes blocks on the left side of the frame, which suffer less distortion, as shown in FIG. 9.

As described above, the information reproduction system according to the second embodiment of the present invention has the following advantage in addition to the advantage of the first embodiment described above. That is, the system determines inappropriate image sensing caused by aberrations and the like arising from deformation of the recording medium and floating/tilt of the CCD scanner, and can sequentially decode in the order from blocks which suffer less distortion. Therefore, the system can select blocks which suffer less distortion from a plurality of decodable blocks, can prevent code reproduction errors, and can reduce decoding of invalid block data.

Furthermore, in real-time processing, the processing must be completed within a one-frame period. However, the information reproduction system according to the second embodiment of the present invention sequentially detects and decodes in the order from valid blocks, valid blocks can be prevented from being omitted due to time-out (out of processing time).

(Third Embodiment)

The third embodiment of the present invention will be described below with reference to FIGS. 10 to 12.

Figure 10:
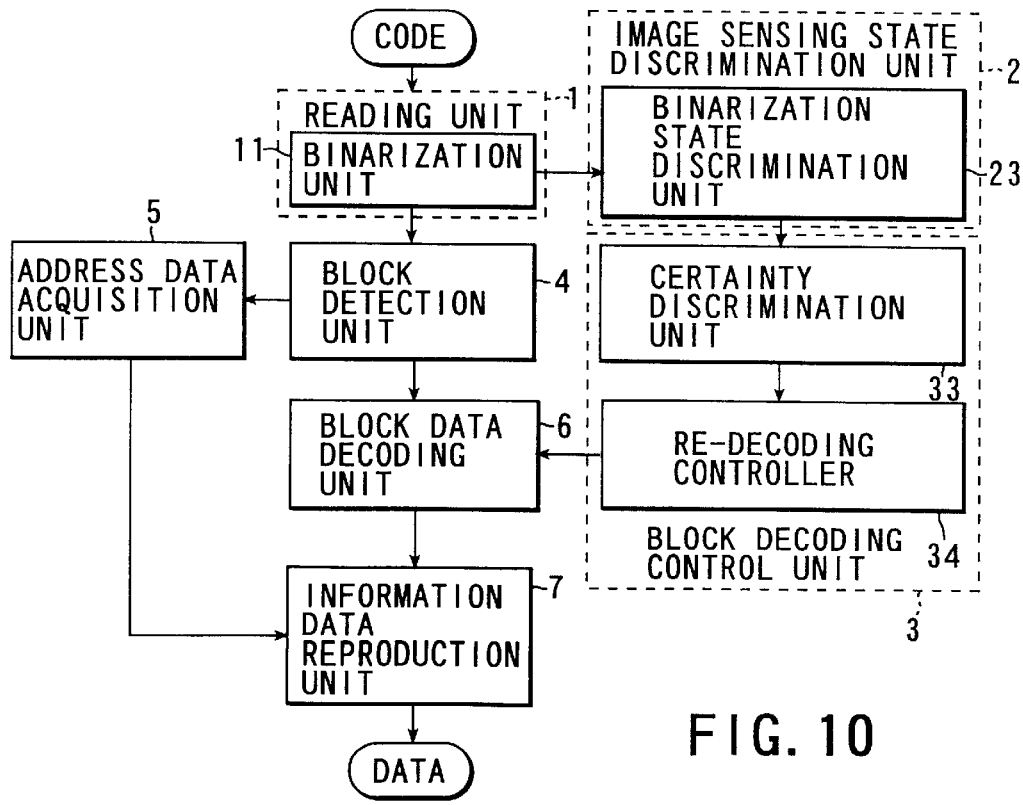
FIG. 10 is a schematic block diagram showing the arrangement of an information reproduction system according to the third embodiment of the present invention.

As shown in FIG. 10, an information reproduction system according to this embodiment comprises a reading unit 1, image sensing state discrimination unit 2, block decoding control unit 3, block detection unit 4, address data acquisition unit 5, block data decoding unit 6, and information data reproduction unit 7.

In this embodiment, the reading unit 1 comprises a binarization unit 11 that can adaptively binarize the sensed code.

The image sensing state discrimination unit 2 comprises a binarization state discrimination unit 23 that discriminates the binarization state of the code by the binarization unit 11.

The block decoding control unit 3 comprises a certainty discrimination unit 33 for determining the certainties of blocks on the basis of the discrimination result of the binarization state by the binarization state discrimination unit 23, and a re-decoding controller 34 for inhibiting or permitting the block data decoding unit 6 from decoding or to decode block data at identical addresses in the subsequent image sensing frames on the basis of the certainties discriminated by the certainty discrimination unit 33.

The operation and advantage of this embodiment will be described below. In the following description, since the units denoted by the same reference numerals as in the first embodiment mentioned above have the same operation and effect as those in the first embodiment, a detailed description thereof will be omitted.

The binarization unit 11 adaptively binarizes the sensed code. When the unit 11 binarizes a code made up of blocks with the structure shown in FIG. 2B, it extracts isolated dots in a code from the binary image of the code, calculates the average area per dot, and controls the threshold value so that the average area approaches a target value, as shown in FIG. 11A.

Let th be that threshold value, and α be a threshold value correction coefficient for the difference between the average area and target value. Then, the corrected threshold value th is given by:

$$th = th + \alpha(\text{target value} - \text{dot area})$$

With this threshold value, the next frame is binarized.

FIG. 11B shows changes in dot area at that time.

Since it is determined that the binarization state of the frame of interest is better as the dot area is closer to the target value "10", the binarization state discrimination unit 23 discriminates the binarization state using the difference between the dot area and target value as a feature.

The certainty discrimination unit 33 determines the certainty of each block data (in the above example, (10–|dot area–target value|)) on the basis of the discrimination result of the binarization state by the binarization state discrimination unit 23.

The re-decoding controller 34 stores the certainties in correspondence with the block addresses. Upon decoding block data, the controller 34 controls not to re-decode if the certainty at the block address of interest is smaller than the stored one, and to re-decode if that certainty is larger than the stored one.

This operation will be explained below with reference to FIG. 12.

In this example, assume that a code is sensed while continuously moving the scanner by, e.g., manual scanning, and blocks are repetitively read like blocks A, B, C, and D in the first frame, and blocks C, D, E, and F in the second frame, as shown in FIG. 12.

In the first frame, block data of all blocks A to D are decoded with certainty "5", and the certainty "5" is stored.

In the second frame, block data of blocks C to F are decoded. At this time, since blocks C and D have already been decoded with the certainty "5", the certainties are compared.

Since the certainty of blocks in the second frame is 8, and is larger than the stored certainty "5", block data are re-decoded.

More specifically, the block data of blocks C and D are rewritten by those from the second frame with better binarization results.

Similarly, in the third frame, block data of blocks E and F are re-decoded.

Finally, in the fourth frame, since the certainty of the block detected in this frame is 9, and block data of blocks G and H have already been decoded with certainty "10", they are not re-decoded, and block data of only blocks I and J are decoded.

Hence, the information reproduction system according to the third embodiment of the present invention has the following advantage in addition to the advantage of the first embodiment described above. That is, the system determines inappropriate binarization caused by binarization errors, and as for block data of blocks with poor binarization results, if block at identical addresses in the subsequent image sensing frames are detected with good binarization results, those block data can be re-decoded. Therefore, block data with higher reliability can be output to the information data reproduction unit 7, thus reducing code reproduction errors.

Note that the binarization unit 11 and the feature used for discriminating the binarization state are not limited to those in this embodiment, and known techniques may be used.

For example, the binarization unit 11 may comprise means for binarizing using an intermediate value between the maximum and minimum values in a subframe as a threshold value.

Also, the binarization state discrimination unit 23 may use the number of processed frames as a feature, and discriminate lower certainties for several frames until binarization control becomes stable, and higher certainties for the subsequent frames.

(Fourth Embodiment)

The fourth embodiment of the present invention will be described below with reference to FIGS. 13 to 16.

Figure 13:
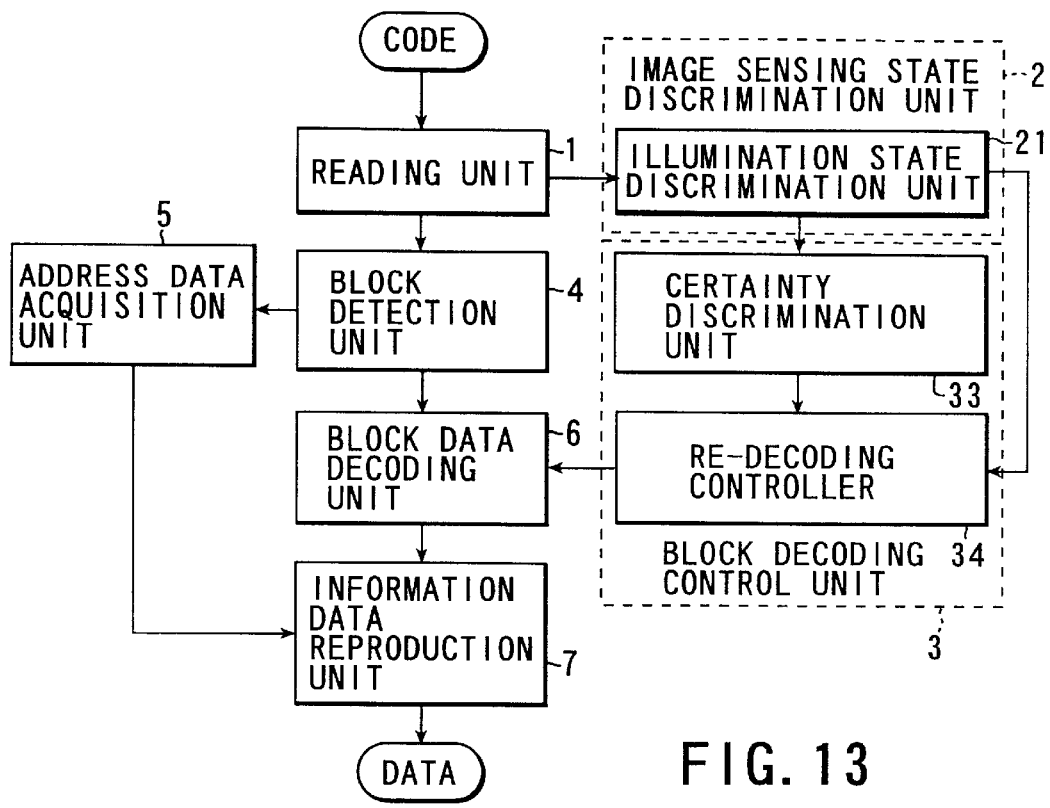
FIG. 13 is a schematic block diagram showing the arrangement of an information reproduction system according to the fourth embodiment of the present invention.

As shown in FIG. 13, an information reproduction system of this embodiment comprises a reading unit 1, image sensing state discrimination unit 2, block decoding control unit 3, block detection unit 4, address data acquisition unit 5, block data decoding unit 6, and information data reproduction unit 7.

In this embodiment, the image sensing state discrimination unit 2 includes an illumination state discrimination unit 21 for discriminating the illumination state.

The block decoding control unit 3 comprises a certainty discrimination unit 33 for determining the certainties of blocks on the basis of the discrimination result of the illumination state by the illumination state discrimination unit 21, and a re-decoding controller 34 for inhibiting or permitting the block data decoding unit 6 from decoding or to decode block data at identical addresses in the subsequent image sensing frames on the basis of the certainties discriminated by the certainty discrimination unit 33.

The operation and advantage of this embodiment will be described below. In the following description, since the units denoted by the same reference numerals as in the first and third embodiments mentioned above have the same operation and effect as those in the first and fourth embodiments, a detailed description thereof will be omitted.

Figure 14:
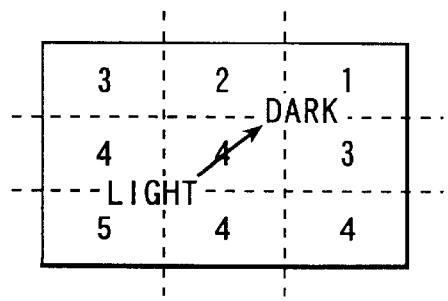
FIG. 14 is a view for explaining certainty assignment by a certainty discrimination unit 33 shown in FIG. 13.

As shown in FIG. 14, the illumination state discrimination unit 21 segments the frame into nine subframes, and extracts features concerning luminance to discriminate the illumination states of the subframes.

The certainty discrimination unit 33 determines the certainties of block data on the basis of the discrimination result of the illumination state discrimination unit 21.

In this case, for example, when the illumination state discrimination unit 21 determines that the upper right portion of the frame is sensed dark, the certainty discrimination unit 33 assigns certainties, as shown in FIG. 14.

On the other hand, if blocks to be sensed shown in FIG. 15A change, as shown in FIGS. 15B and 15C, as code scanning progresses, and the certainty of a block that appears in a plurality of subblocks is lowest, the certainties of the blocks are assigned, as shown in FIG. 16.

The re-decoding controller 34 stores these certainties in association with the block addresses. Upon decoding block data, the controller 34 controls not to re-decode if the certainty at the block address of interest is smaller than the stored one, and to re-decode if that certainty is larger than the stored one.

Also, the controller 34 may control not to re-decode if the certainty is smaller than a predetermined value.

This operation will be explained below with reference to FIG. 16.

In this example, assume that a code is sensed while continuously moving the scanner by, e.g., manual scanning, and blocks are repetitively read like blocks C, D, E, F, G, and H in the m-th frame, and blocks A, B, C, D, E, and F in the (m+1)-th frame, as shown in FIG. 16.

In the m-th frame, block data of all blocks C, D, E, F, G, and H are decoded to respectively have certainties "2", "1", "4", "3", "4", and "4", and these certainties "2", "1", "4", "3", "4", and "4" are stored.

Subsequently, in the (m+1)-th frame, block data of blocks A, B, C, D, E, and F are decoded. At this time, since blocks C, D, E, and F have already been decoded to have certainties "4", "3", "4", and "4", their certainties are compared.

Since blocks C, D, and F in the (m+1)-th frame have certainties "4", "3", and "4" which are larger than the stored certainties "2", "1", and "3", their block data are re-decoded.

In other words, the block data of blocks C, D, and F are rewritten by data from the (m+1)-th frame with better binarization results.

Since block E in the (m+1)-th frame has the certainty "4" and its block data has already been decoded to have the certainty "4", it is not re-decoded.

As described above, the information reproduction system according to the fourth embodiment of the present invention has the following advantage in addition to the advantage of the above-mentioned first embodiment. That is, the system assigns certainties according to the illumination state to the respective block data, and controls decoding on the basis of these certainties. Hence, as for block data in a block sensed under a poor illumination condition, if the block at an identical address is detected in the subsequent image sensing frames with a good illumination state, the block data can be re-decoded, and block data with higher reliability can be output to the information data reproduction unit 7, thus reducing code reproduction errors.

(Fifth Embodiment)

The fifth embodiment of the present invention will be described below with reference to FIGS. 17 and 18.

Figure 17:
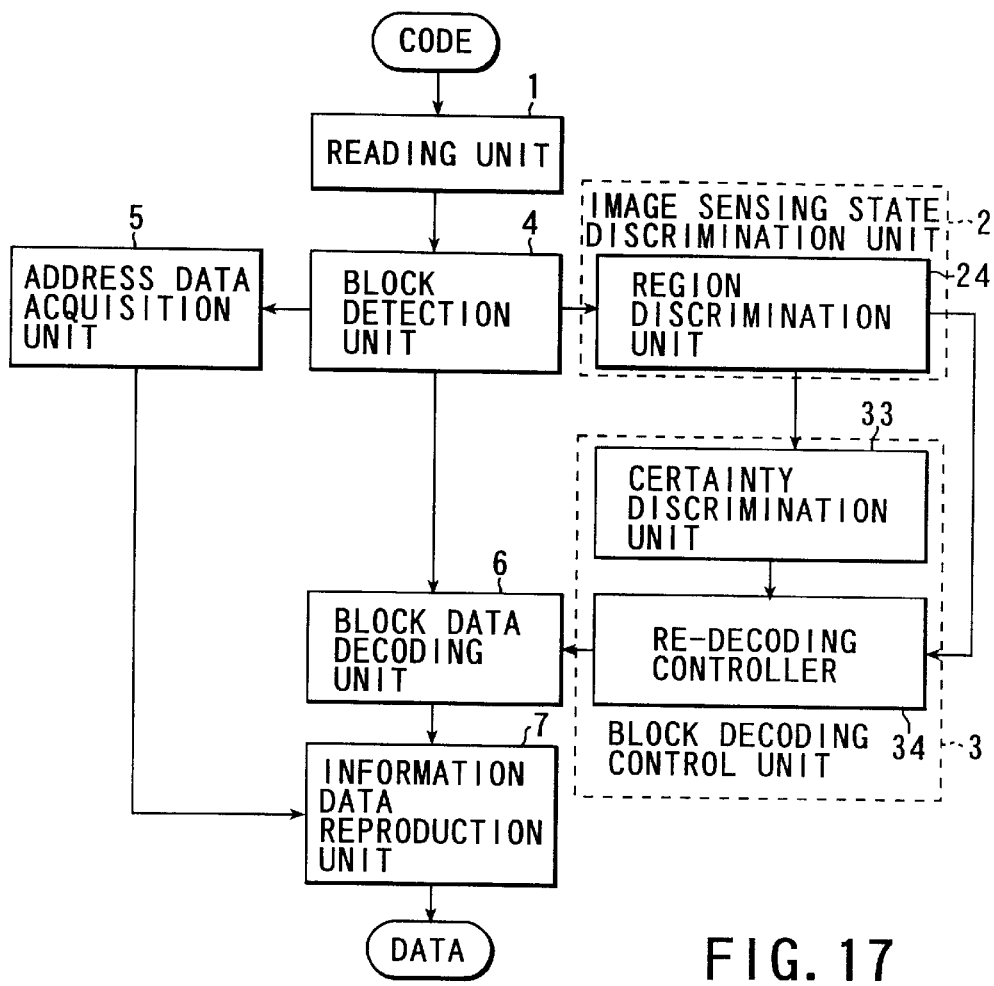
FIG. 17 is a schematic block diagram showing the arrangement of an information reproduction system according to the fifth embodiment of the present invention.

As shown in FIG. 17, an information reproduction system of this embodiment comprises a reading unit 1, image sensing state discrimination unit 2, block decoding control unit 3, block detection unit 4, address data acquisition unit 5, block data decoding unit 6, and information data reproduction unit 7.

As shown in FIG. 17, in this embodiment, a region discrimination unit 24 for determining the region to which the respective blocks in the image sensing frame belong corresponds to the image sensing state discrimination unit 2.

The block decoding control unit 3 comprises a certainty discrimination unit 33 for determining the certainties of blocks on the basis of the discrimination result of the region to which the blocks belong, and a re-decoding controller 34 for inhibiting or permitting the block data decoding unit 6 from decoding or to decode block data at identical addresses in the subsequent image sensing frames on the basis of the certainties determined by the certainty discrimination unit 33.

The operation and effect of this embodiment will be described below. In the following description, since the units denoted by the same reference numerals as in the fourth embodiment mentioned above have the same operation and effect as those in the fourth embodiment, a detailed description thereof will be omitted.

Figure 18:
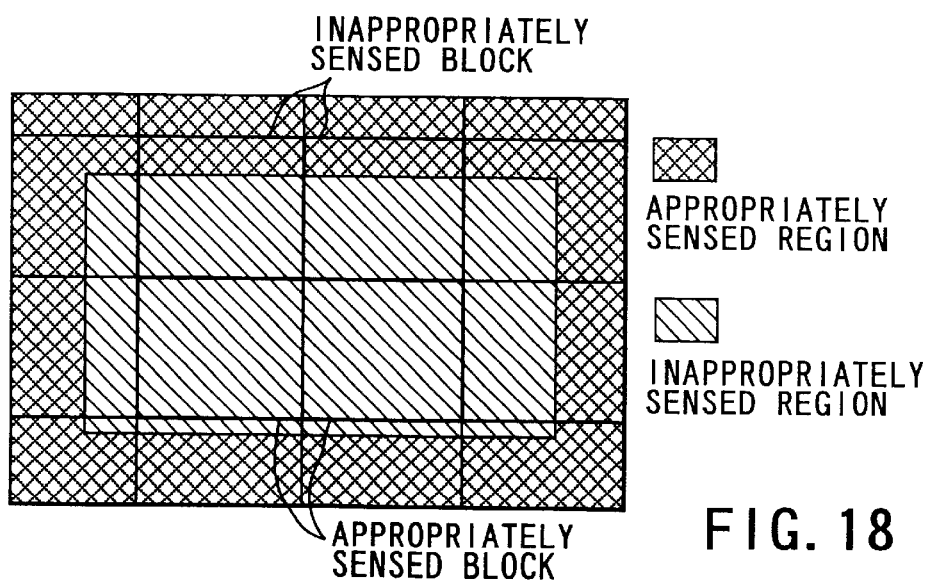
FIG. 18 is a view for explaining image sensing region setups by a region discrimination unit 24 shown in FIG. 17.

As shown in FIG. 18, the region discrimination unit 24 stores regions having good image sensing states in advance, and discriminates the image sensing states in units of blocks as follows. That is, when a block detected by the block detection unit 4 falls within the stored good image sensing state region, the unit 24 determines that the image sensing state of that block is good; when the block falls outside that region, the unit 24 determines that the image sensing state of that block is poor.

The good image sensing state region is determined on the basis of changes in image sensing state of a code which is determined by allowable floating/tilt of the CCD scanner.

The certainty discrimination unit 33 determines a high certainty for block data of blocks which are discriminated by the region discrimination unit 24 to fall within the good image sensing state region; otherwise, determines a low certainty.

Upon decoding block data, even if the block data of interest has already been decoded, if it has a low certainty, the re-decoding controller 34 controls the block data decoding unit 6 to re-decode that block; if it has a high certainty, the re-decoding controller 34 controls the unit 6 not to re-decode.

With this control, the information reproduction system according to the fifth embodiment of the present invention has the following advantage in addition to the advantage of the first embodiment described above. That is, the system stores the relationship between the positions and image sensing states in the image sensing frame, and discriminates the image sensing state of a code on the basis of the position of a block detected by the block detection unit. Hence, any inappropriate sensing can be easily discriminated, and appropriately sensed blocks can be selected.

The present invention has been described based on the first to fifth embodiments, and the present specification includes the following inventions.

(1) An information reproduction system which comprises:
reading means for optically reading a code, which is defined by a plurality of blocks each of which includes a data pattern, which is imaged in accordance with contents of block data obtained by segmenting information data in units of predetermined information volumes, and a header pattern, which is imaged in accordance with contents of a block header indicating an address assigned to each block, and which blocks are arranged according to a predetermined block layout format, by sensing the code so as to include a plurality of blocks within one image sensing frame;

block detection means for detecting the blocks from the code within one image sensing frame read by the reading means;

address data acquisition means for acquiring address data of the blocks detected by the block detection means;

block data decoding means for decoding block data from the data patterns of the blocks detected by the block detection means; and information data reproduction means for reproducing original information data by coupling the block data decoded by the block data decoding means in accordance with the address data acquired by the address data acquisition means, the information reproduction system is characterized by further comprising:

image sensing state discrimination means for discriminating an image sensing state of the code read by the reading means; and block decoding control means for controlling the block data decoding means based on the code image sensing state discriminated by the image sensing state discrimination means so as to preferentially decode appropriately sensed blocks of the plurality of decodable blocks.

The first embodiment corresponds to an embodiment according to this invention, and its arrangement is as shown in FIG. 1.

The image sensing state discrimination means corresponds to the illumination state discrimination unit of the first embodiment, and the block decoding control means corresponds to the block detection order controller and block data decoding order controller in the first embodiment.

Figure 2A:
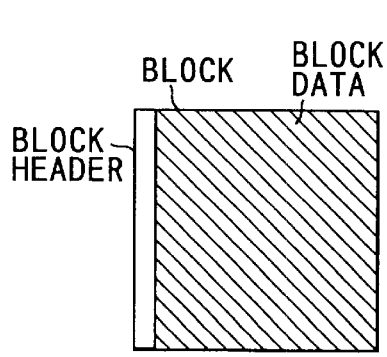
FIGS. 2A and 2B show the block structure of a code sensed by a reading unit 1 shown in FIG. 1, and its physical structure upon recording.
Figure 2B:
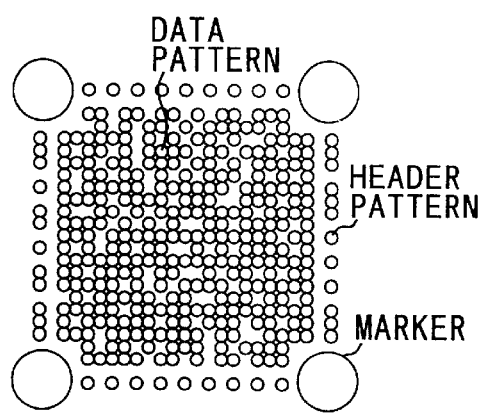

Each block has a block header and block data, as shown in FIG. 2A, and is recorded to have a physical structure, as shown in, e.g., FIG. 2B.

Note that each block may have other shapes such as triangular shape, hexagonal shape, and the like, and FIGS. 2A and 2B do not limit the shape and positional relationship.

Each block has a size that allows one image sensing frame to include a plurality of blocks, and the blocks are recorded according to a predetermined layout format, as shown in FIG. 3.

(Operation)

The image sensing state discrimination means extracts a feature pertaining to the image sensing state of a code from the reading means or the image sensing frame read by the reading means, and discriminates the image sensing state of the code.

The block decoding control means controls the block decoding methods, e.g., the block decoding order, permission/inhibition of re-decoding, and the like on the basis of the image sensing state of the code discriminated by the image sensing state discrimination means, so that appropriately sensed blocks of a plurality of decodable blocks are preferentially decoded.

(Advantage)

Since the block decoding methods can be controlled in accordance with the image sensing state of the code so that appropriately sensed blocks are preferentially decoded, code reproduction errors due to decoding of inappropriately sensed blocks can be prevented, and decoding of invalid block data can be reduced.

(2) The information reproduction system of (1) is characterized in that the image sensing state discrimination means discriminates the image sensing state in units of subframes obtained by segmenting the one image sensing frame into a plurality of regions each having an area substantially equal to or larger than the block.

The first embodiment corresponds to an embodiment according to this invention, and its arrangement is as shown in FIG. 1.

(Operation)

As shown in FIG. 4, the image sensing state discrimination means segments one image sensing frame into a plurality of regions each having an area substantially equal to or larger than each block, extracts features concerning the image sensing state of a code in units of segmented subframes, and discriminates the image sensing state on the basis of the relationship between the subframe positions and extracted features.

(Advantage)

With this arrangement, since the image sensing state of the code in the image sensing frame can be discriminated in units of subframes, non-uniform image sensing in the image sensing frame can be coped with.

(3) The information reproduction system of (1) or (2) is characterized in that the image sensing state discrimination means comprises illumination state discrimination means for extracting a feature pertaining to luminance from the image sensing frame read by the reading means, and discriminating an illumination state of the code upon image sensing.

The first embodiment corresponds to an embodiment according to this invention, and its arrangement is as shown in FIG. 1.

(Operation)

The illumination state discrimination means extracts features pertaining to luminance from the code read by the reading means, and discriminates the illumination state of the code upon image sensing.

Note that the illumination state indicates the illumination amount or shading state of a code.

(Advantage)

Since the image sensing state discrimination means has the above-mentioned arrangement, inappropriate image sensing caused by shading or the like arising from illumination variations or tilt of the scnaner can be discriminated, and more appropriately sensed blocks can be selected.

(4) The information reproduction system of (1) is characterized in that the image sensing state discrimination means comprises distortion state discrimination means for extracting a feature pertaining to shape from the code read by the reading means, and discriminating a distortion state of the code upon image sensing.

The second embodiment corresponds to an embodiment according to this invention, and its arrangement is as shown in FIG. 7.

(Operation)

The distortion state discrimination means extracts features associated with shape from the code read by the reading means, and discriminates the distortion state of the code upon image sensing.

(Advantage)

Since the image sensing state discrimination means has the above-mentioned arrangement, inappropriate image sensing caused by aberrations or the like arising from deformation of a recording medium or floating/tilt of the scanner can be discriminated, and blocks which suffer less distortion can be selected.

(5) The information reproduction system of (1) or (2) is characterized in that the reading means comprises binarization means for adaptively binarizing the sensed code, and the image sensing state discrimination means comprises binarization state discrimination means for discriminating a binarization state of the code by the binarization means.

The third embodiment corresponds to an embodiment according to this invention, and its arrangement is as shown in FIG. 10.

(Operation)

The binarization means adaptively binarizes the sensed code. The binarization state discrimination means extracts features concerning the binarization state from the binarization means or a binary image, and discriminates the binarization state on the basis of the difference between each feature and target value.

Note that the binarization state indicates adaptive control in the binarization means or expansion/shrinkage of a code dark portion depending on a set threshold value.

(Advantage)

Since the image sensing state discrimination means has the above-mentioned arrangement, the state of a binary image during a transition period for adaptive binarization control or an inappropriate binary image due to binarization errors can be discriminated, and appropriately binarized blocks can be selected.

(6) The information reproduction system of (1) is characterized in that the block decoding control means includes block detection order control means for controlling a block detection order of the block detection means on the basis of a discrimination result of the code image sensing state by the image sensing state discrimination means.

The first embodiment corresponds to an embodiment according to this invention, and its arrangement is as shown in FIG. 1.

(Operation)

The block detection order control means controls the block detection order on the basis of the discrimination result of the code image sensing state by the image sensing state discrimination means so that blocks are detected from a portion which was sensed well.

Note that block detection is to detect constituting elements of a block from the image sensing frame, and corresponds to marker detection in a block with the structure shown in, e.g., FIG. 2B.

(Advantage)

Since the block decoding control means has the above-mentioned arrangement, blocks can be detected from a portion which was sensed well, and block detection can be easily and reliably done.

Furthermore, even when the number of blocks to be detected, the time required for block detection, or the like is limited, processing can be done from valid blocks, thus also attaining a reduction of the memory capacity and high-speed processing.

(7) The information reproduction system of (1) is characterized in that the block decoding control means includes block decoding order control means for controlling a block data decoding order of the block detection means on the basis of a discrimination result of the code image sensing state by the image sensing state discrimination means.

The first embodiment corresponds to an embodiment according to this invention, and its arrangement is as shown in FIG. 1.
(Operation)
The block data decoding order control means controls the block data decoding order on the basis of the discrimination result of the code image sensing state by the image sensing state discrimination means so that blocks are detected from a portion which was sensed well.
(Advantage)
Since the block decoding control means has the above-mentioned arrangement, blocks can be decoded from blocks with a good image sensing state, and block decoding can be easily and reliably done.

Furthermore, even when the time required for block data decoding or the like is limited, since processing can be done in the order from valid blocks, high-speed processing can be realized.

(8) The information reproduction system of (1) is characterized in that the block decoding control means includes:
certainty determination means for determining certainties of the blocks on the basis of a discrimination result of the code image sensing state by the image sensing state discrimination means; and
re-decoding control means for inhibiting or permitting the block data decoding means from decoding or to decode block data at an identical address in a subsequent image sensing frame on the basis of the certainties determined by the certainty determination means.

The third and fourth embodiments respectively correspond to an embodiment according to this invention, and their arrangements are as shown in FIGS. 10 and 13.
(Operation)
The certainty discrimination means determines the certainties of the respective block data on the basis of the discrimination result of the code image sensing state by the image sensing state discrimination means.

For example, the means determines a high certainty for block data of a block with a good image sensing state, or determines a low certainty for other block data. Upon decoding of block data, even when the block data of interest has already been decoded, the re-decoding control means controls the block data decoding means to re-decode if its certainty is low; otherwise, not to re-decode.
(Advantage)
In this way, since certainties corresponding to the image sensing state are assigned to the respective block data, and decoding is controlled on the basis of the certainties, block data with a low certainty can be re-decoded if a block at an identical address is detected in the subsequent image sensing frames. For this reason, block data with higher reliability can be output to the information data reproduction means, and code reproduction errors can be reduced.

(9) The information reproduction system of (1) is characterized in that the image sensing state discrimination means stores a relationship between positions in the image sensing frame and the image sensing state in advance, and discriminates the image sensing state of the code on the basis of positions of the blocks detected by the block detection means in the image sensing frame.

The fifth embodiment corresponds to an embodiment according to this invention, and its arrangement is as shown in FIG. 17.

In this embodiment, region discrimination means corresponds to the image sensing state discrimination means, and the block decoding control means comprises certainty discrimination means and re-decoding control means.
(Operation)
As shown in FIG. 18, the region discrimination means stores a good image sensing state region in advance, and discriminates the image sensing state in units of blocks. That is, if the detected block falls within the good image sensing state region, the means determines that the block has a good image sensing state; otherwise, it determines that the block has a poor image sensing state.
(Advantage)
As described above, the relationship between the positions in the image sensing frame and image sensing state is stored in advance, and the image sensing state is discriminated on the basis of the positions of the detected blocks in the image sensing frame, thus easily determining inappropriate image sensing. Hence, appropriately sensed blocks can be selected.

Therefore, as described in detail above, according to the present invention, an information reproduction system that can prevent code reproduction errors due to decoding of inappropriately sensed blocks, and can reduce decoding of invalid block data can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An information reproduction system comprising:

reading means for optically reading a code by sensing the code to include a plurality of blocks within one image sensing frame, the code having a plurality of blocks arranged according to a predetermined block arrangement format, each of said blocks having at least a data pattern image corresponding to the content of block data formed by segmenting information data of the code in units of predetermined data volume and a header pattern image formed according to the content of a block header indicating an address allocated to each block;

block detection means for detecting the blocks from the code within one image sensing frame read by said reading means;

address data acquisition means for acquiring address data of each block detected by said block detection means;

block data decoding means for decoding block data from the data pattern of each block detected by said block detection means;

information data reproduction means for reproducing original information data by combining the block data decoded by said block data decoding means in accordance with the address data acquired by said address data acquisition means;

image sensing condition discrimination means for discriminating whether an image sensing condition of the code read by said reading means is good or bad; and block decoding control means for controlling said block data decoding means based on the good or bad code image sensing condition discriminated by said image sensing condition discrimination means so as to preferentially decode appropriately sensed blocks of the plurality of decodable blocks.

2. A system according to claim 1, wherein said image sensing condition discrimination means discriminates the image sensing condition in units of subframes obtained by segmenting the one image sensing frame into a plurality of regions each having an area substantially equal to or larger than the block.

3. A system according to claim 1, wherein said image sensing condition discrimination means comprises shading condition discrimination means for extracting a feature pertaining to luminance from the image sensing frame read by said reading means, and discriminating a shading condition of the code upon image sensing.

4. A system according to claim 1, wherein said image sensing condition discrimination means comprises distortion condition discrimination means for extracting a feature pertaining to shape from the code read by said reading means, and discriminating a distortion condition of the code upon image sensing.

5. A system according to claim 1, wherein said reading means comprises binarization means for adaptively binarizing the sensed code, and said image sensing condition discrimination means comprises binarization condition discrimination means for discriminating a binarization condition of the code by said binarization means.

6. A system according to claim 2, wherein said reading means comprises binarization means for adaptively binarizing the sensed code, and said image sensing condition discrimination means comprises binarization condition discrimination means for discriminating a binarization condition of the code by said binarization means.

7. A system according to claim 1, wherein said block decoding control means includes block detection order control means for controlling a block detection order of said block detection means based on a discrimination result of the code image sensing state by said image sensing condition discrimination means.

8. A system according to claim 1, wherein said block decoding control means includes block decoding order control means for controlling a block data decoding order of said block detection means based on a discrimination result of the code image sensing state by said image sensing condition discrimination means.

9. A system according to claim 1, wherein said block decoding control means includes:

certainty determination means for determining certainties of the blocks based on a discrimination result of the code image sensing state by said image sensing condition discrimination means; and re-decoding control means for inhibiting or permitting said block data decoding means from decoding or to decode block data having a same address in a subsequent image sensing frame based on the certainties determined by said certainty determination means.

10. A system according to claim 1, wherein said image sensing condition discrimination means stores a relationship between positions in the image sensing frame and the image sensing state in advance, and discriminates the image sensing state of the code based on positions of the blocks detected by said block detection means in the image sensing frame.

11. An information reproduction system comprising:

a reader for optically reading a code by sensing the code to include a plurality of blocks within one image sensing frame, the code having a plurality of blocks arranged according to a predetermined block arrangement format, each of said blocks having at least a data pattern image corresponding to the content of block data formed by segmenting information data of the code in units of predetermined data volume and a header pattern image formed according to the content of a block header indicating an address allocated to each block;

a block detector for detecting the blocks from the code within one image sensing frame read by said reader;

an address data acquisition device for acquiring address data of each block detected by said block detector;

a block data decoder for decoding block data from the data pattern of each block detected by said block detector;

an information data reproduction device for reproducing original information data by combining the block data decoded by said block data decoder in accordance with the address data acquired by said address data acquisition device;

an image sensing condition discrimination device for discriminating whether an image sensing condition of the code read by said reader is good or bad; and a block decoder for controlling said block data decoder based on the good or bad code image sensing condition discriminated by said image sensing state discrimination device so as to preferentially decode appropriately sensed blocks of the plurality of decodable blocks.

12. A code information reproduction method comprising the steps of:

optically reading a code by sensing the code to include a plurality of blocks within one image sensing frame, the code having a plurality of blocks arranged according to a predetermined block arrangement format, each of said blocks having at least a data pattern image corresponding to the content of block data formed by segmenting information of the code in units of predetermined data volume and a header pattern image formed according to the content of a block header indicating an address allocated to each block;

detecting the blocks from the read code within one image sensing frame;

acquiring address data of each detected block;

decoding block data from the data pattern of each detected block;

reproducing original information data by combining the decoded block data in accordance with the acquired address data;

discriminating whether an image sensing condition of the code read by said reading means is good or bad; and controlling the block data decoding step based on the discriminated good or bad code image sensing condition so as to preferentially decode appropriately sensed blocks of the plurality of decodable blocks.

* * * * *